Figure 1:
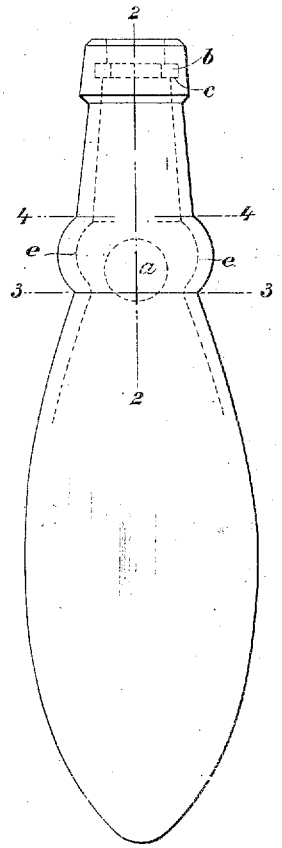

H. CODD.

Assignor to self and R. BARRETT.

Bottle and Bottle-Stopper.

No. 8,372. Reissued Aug. 13, 1878.

WITNESSES

Wm A Skinkle

Roberdeau Buchanan.

INVENTOR

Hiram Codd.

By his Attorneys

Baldwin, Hopkins & Peyton.

BEST AVAILABLE COPY

UNITED STATES PATENT OFFICE.

HIRAM CODD, OF CAMBERWELL, ENGLAND, ASSIGNOR TO HIMSELF AND RICHARD BARRETT.

IMPROVEMENT IN BOTTLES AND BOTTLE-STOPPERS.

Specification forming part of Letters Patent No. 129,652, dated July 23, 1872; Reissue No. 8,372, dated August 13, 1878; application filed July 8, 1878; patented in England November 24, 1870, and August 22, 1871.

*To all whom it may concern:*

Be it known that I, HIRAM CODD, of No. 17 Queen's Row, Grove Lane, Camberwell, in the county of Surrey, England, a subject of the Queen of Great Britain, have invented certain new and useful Improvements in Bottles and Stoppers therefor, and an improved method of securing stoppers within bottles, of which the following is a specification:

My invention relates to improvements in bottles of the class adapted to be closed by internal stoppers. English Letters Patent respectively dated and numbered November 24, 1870, 3,070, and August 22, 1871, 2,212, have heretofore been granted me for improvements hereinafter described.

My objects mainly are to guard against injury to the bottles by sudden or violent movement of the stoppers; to provide durable stoppers, and such as are not affected by and do not affect the contents of the bottles; to facilitate the emptying of the bottles, and to adapt the stoppers to the bottles in such manner that they may readily and quickly be caused to close them.

My invention consists, first, in a novel method of adapting stoppers to bottles of the class which are tightly closed by the outward movement of the stoppers up to their open ends or mouths, which consists in providing a bottle with a loose tumbling, shifting, or rolling internal stopper in its upper portion or neck, which is provided with a chamber in such manner that the bottle may be opened and left wholly unobstructed at the mouth by forcing in the stopper entirely away from the mouth, and the stopper be prevented from dropping down into the body of the bottle, while the liquid may flow out at the end of the bottle, without obstruction, past the stopper; second, in the combination, with a bottle, of a loose internal unpacked stopper composed wholly of glass, adapted to move outward to close the open end or mouth of the bottle and to drop away therefrom in opening the bottle, whereby the stopper may be forced to the mouth by internal pressure, is rendered durable, and is not liable to affect the contents of the bottle or be itself injured thereby; third, in the combination of a bottle having an internal elastic packing at its mouth, and an internal gravitating stopper which is practically incompressible, and does not perceptibly wear or change its shape, whereby the necessity of changing the stoppers after long use is avoided and I am enabled to permanently secure the stoppers within the bottles; fourth, in a bottle having a loose internal stopper, and provided with an impediment to the movement of the stopper toward its mouth, whereby the bottle may be tilted to empty it without closing its mouth; fifth, in a bottle having an internal loose stopper adapted to move outward to close its open end or mouth, and to be held up to the mouth by pressure from within, so as to prevent the accidental escape of the contents of the bottle, and provided with an obstruction at the lower part of its neck to prevent the stoppers dropping into the body of the bottle when forced inward from without, whereby the bottle may freely be emptied by the flow of the liquid past or beyond the stopper in the neck, and liability to fracture the bottle is lessened; sixth, in a bottle having an open end or mouth and an internal stopper loosely secured in its neck below the mouth, so that it may be caused to move up to the mouth of the bottle to tightly close it when subjected to pressure from within, and is prevented from falling to the bottom or into the body of the bottle when opened; seventh, in the combination of a bottle having an internally-packed mouth or stopper-seat and an internal loose gravitating-stopper limited in its range of movement to the neck of the bottle, whereby the position of the stopper may readily be perceived, it may quickly be moved to its seat, and injury to the bottle by impact of the stopper is prevented; eighth, in the combination of a bottle having an internally-packed mouth and an internal glass stopper permanently confined within the bottle by a shoulder or inward projection at the mouth above the packing; ninth, in a novel method of permanently securing stoppers within bottle and confining them below the mouths or discharge-openings, which consists in placing the stopper in the bottle, and then reducing the size of the mouth of the bottle so as to render it impossible for the stopper to be forced out or beyond the point at which the liquid escapes in emptying the bottle; tenth, in a bottle having a contraction at the base of its neck, a packing in a groove in its mouth, and an internal stopper confined in its movement to the chamber so formed between the mouth and packing; eleventh, in a bottle having a recess in its neck, an internal stopper, and a contraction at the base of its neck, whereby the bottle is closed by the pressure of the stopper upward, the stopper is prevented from dropping into the bottle-body, and may be kept back from the mouth by resting in the recess to admit of emptying the bottle.

According to my improvements I provide bottles for containing aerated or effervescing liquids with internal gravitating stoppers, so that a bottle may be filled without impediment from the stopper, and when filled is tightly closed by the stopper held by the pressure within the bottle against a yielding packing or ring of elastic material placed around the interior of the mouth of the bottle. For the purpose of most effectually guarding against accidental loss of the contents of the bottle by the stopper being forced out through the elastic packing by the pressure within the bottle, the mouth above this elastic ring or stopper-seat is provided with an internal projection or shoulder, or is thickened or bulged inwardly, so as to narrow the outlet or reduce the mouth to a diameter smaller than that of the stopper, and the stopper itself is, practically considered, rigid or incompressible. I employ a gravitating stopper—that is, one of a specific gravity greater than the contents of the bottle.

The stopper hereinafter specifically referred to consists of a glass ball or marble. It does not appreciably wear or change shape. A gravitating stopper, when made round and of a material which preserves its shape and practically resists wear will always find its seat truly against the packing at the mouth of the bottle when the bottle is inverted or inclined mouth downward, and, when so seated, the bottle having been supplied with the liquid, the internal pressure prevents displacement of the stopper or leakage by movement or jarring of the bottle. Such a stopper moves more readily and quickly to its seat than a stem or plug stopper or a compressible stopper, and may advantageously be used whether it be confined in its movement wholly within the neck of the bottle or allowed to move from the mouth to the bottom.

I would here remark that I am aware that gravitating stoppers were invented prior to my invention; but all such stoppers, so far as my knowledge extends, were of yielding or compressible material, more or less liable to wear and get out of shape. I prefer to confine the movements of the stopper to the neck of the bottle, or limit its movement to a space or chamber between the mouth and body of the bottle. By thus shortening the range of movement of the stopper liability to injure the bottle by a blow of the stopper caused by any sudden movement which would violently set the stopper in motion when the bottle is empty is avoided, and the stopper may more quickly be adjusted. I also provide for keeping the stopper away from the mouth of the bottle when it is being emptied. When the bottle is tilted to pour out its contents the movement of the stopper toward its seat in the mouth is impeded. This impediment to the movement of the stopper toward the mouth is shown as provided by a cavity or recess in the bottle itself. Two such cavities or recesses are formed in the neck below the elastic ring. The stopper partly enters or rests in one or the other of these holding cavities or recesses, so as to be held at or near the base of the neck while the bottle is being emptied. When the bottle is opened by pressing back the stopper, the stopper is arrested by an obstruction at the lower part of the neck, and its passage into the body of the bottle is prevented. This obstruction is provided by contracting the lower part of the neck or inlet to the body of the bottle.

The particular bottle I prefer to employ is formed, as will hereinafter be set forth, with a ball-stopper placed in it during its formation, and secured so as to have its movements confined to the neck of the bottle or between the mouth and body.

Figure 2:
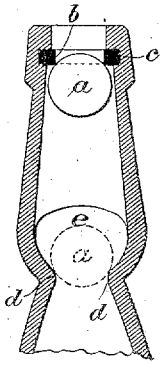
Figure 2:
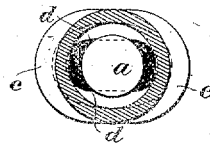
Figure 4:
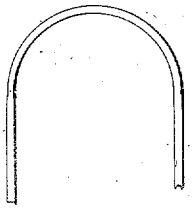
Figure 5:
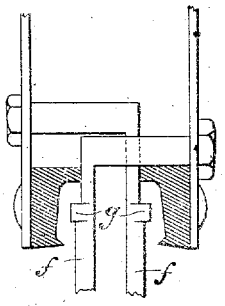
Figure 3:
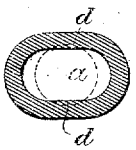

In the accompanying drawings, Figure 1 is a side view of the bottle; Fig. 2, a longitudinal central section of the neck and head of the bottle, showing the stopper seated in the mouth in full lines, and resting at the base of the neck in dotted lines. Fig. 3 is a transverse section on the line 3 3 of Fig. 1; Fig. 4, a similar section on the line 4 4 of Fig. 1, and Fig. 5 a view of a tool suitable for forming the mouth and head of the bottle.

In these figures, *a* is the gravitating stopper or glass ball; *b*, the ring of vulcanized india-rubber, cork, or other elastic material, placed in a groove, *c*, around the interior of the mouth; *d d*, the contraction at the lower part of the neck, and *e e* the recesses for the ball to be in while the contents of the bottle are being poured out.

It will be seen that the lower part of the neck is contracted from two sides only, so that at this point the bottle is of an oval form in section, as shown at Fig. 3. The passage between the interior of the bottle and the neck can thus never be closed by the ball stopper, and therefore no difficulty will be experienced in filling the bottle.

The drawing shows the body of the bottle to be shaped like an ordinary soda-water bottle; but it may be of any form desired.

In order to construct such a bottle, a tool (shown at Fig. 5) is employed. This tool is similar to the ordinary tongs heretofore used for molding the heads of glass bottles in so far as regards the parts required for shaping the head; but, in addition to each arm or limb of the tongs carrying at its ends half-molds for shaping the interior of the head, as heretofore, they also carry pieces *f f* for shaping its interior. These parts are drawn together when the tongs are opened, so that they can readily enter the neck of a bottle and move apart when the tongs are closed, and they then come into position for shaping the interior of the head, as shown in the drawing. The projections *g* on the pieces *f* form a groove around the interior of the head, while at the same time the top of the head above where the groove is formed is contracted so as to bring it to a less internal diameter than the lower part of the head below the groove.

The bottle is formed in the following manner: A bubble of glass is first blown, and is roughly reduced to the desired form by rolling and pressing it upon a stone. The roughly-shaped bubble is then inclosed in a mold of the form desired, and the bottle is blown therein in the ordinary manner. When the bottle has been removed from the mold a glass marble, previously heated, is dropped into the bottle through the neck. The ring or head is then formed at the top of the neck in the ordinary manner by means of the tool above described. After the bottle has been allowed to cool a ring of cork or other elastic material—as, for example, of vulcanized india-rubber—is inserted into the groove formed around the interior of the head, and the bottle is ready for filling with an effervescing or aerated liquid.

To open a bottle closed in the manner above described, it is only necessary to press back the ball away from the elastic ring, when the ball will drop down, and it may either be allowed to fall to the bottom of the bottle, or, if the bottle is formed, in the manner shown by the drawing, with a contraction at the lower part of the neck, the ball may be arrested by this contraction.

By the employment of an internal glass stopper in conjunction with a packing-ring in the mouth of the bottle I avoid the necessity of renewing the stopper, which neither injuriously wears nor changes shape. From time to time, if required, the packing-ring may be renewed at trifling expense and with but little trouble. By guarding against the fall of the loose stopper to the mouth of the bottle when it is being emptied, by automatically arresting the stopper when set in motion or has imparted to it a tendency to move either by the outflowing current or by gravity, the necessity of holding the stopper back from without is avoided.

By guarding against the fall of the heavy stopper from the mouth of the bottle to the bottom liability to fracture the bottle is prevented, and by confining the stopper so that it is at all times within the neck of the bottle its position may readily be seen, and less time is taken to seat the stopper than would be required were it to traverse the whole length of the bottle.

A glass stopper neither injuriously affects nor is affected by the contents of the bottle.

By turning or partially rotating the bottle about its longitudinal axis the stopper may be caused to enter or leave the recess by manipulating the bottle, as will readily be understood.

I claim as of my own invention—

1. The hereinbefore-described method of providing the bottle having the open end or mouth with a loose tumbling internal stopper adapted to move outward and up to the mouth to tightly close it, which consists in limiting the movement of the stopper (in moving away from and up to the mouth) to the neck of the bottle inside or below its mouth or point of discharge, the contents of such bottles, when emptying them, being caused to flow past the stoppers on the way to the mouths of the bottles, which are left wholly unobstructed.

2. The combination, with the bottle having the open end or mouth, of an internal unpacked stopper below the mouth, composed wholly of glass, and adapted to move outward to close the mouth when subjected to pressure from within and to drop downward below and away from the mouth in opening the bottle, substantially as and for the purpose set forth.

3. The combination, substantially as hereinbefore set forth, of a bottle having an internal elastic packing at its mouth and an internal gravitating rigid stopper practically incompressible and incapable of wear or change in shape.

4. A bottle having an internal loose stopper and provided with a recess to prevent the movement of the stopper toward its mouth, substantially as hereinbefore set forth, whereby the bottle may be tilted to empty it without closing its mouth.

5. A bottle having the open end or mouth, and an internal loose stopper below the mouth, adapted to move outward by pressure from within to close the mouth, and provided with a contraction at the lower part of its neck to prevent the stopper, when forced inward, from dropping into the body of the bottle, substantially as hereinbefore set forth, whereby the bottle may be emptied by the flow of the liquid past the stopper in the neck and thence to the mouth.

6. The bottle having the open end or mouth, and a loose internal stopper in its neck below the mouth, said stopper being confined in its movements, in opening and closing the bottle, to the neck or space between the mouth and body of the bottle, and adapted to be forced outward or upward to close the mouth, and to drop downward below and away from the mouth to allow the liquid to flow past it in emptying the bottle, substantially as hereinbefore set forth.

7. The combination, substantially as hereinbefore set forth, of a bottle having an internally-packed mouth and chambered neck and an internal loose stopper in said chamber, and limited in its range of movement to the neck of the bottle, whereby the stopper may readily and quickly be brought to its seat and injury to the bottle is avoided.

8. The combination, substantially as hereinbefore set forth, of a bottle having an internally-packed mouth and an internal glass ball-stopper of greater diameter than the mouth of the bottle.

9. The hereinbefore-described method of securing stoppers in bottles and confining them below the mouths or discharge-openings thereof, which consists in placing the stopper in the bottle during its formation, and then reducing the size of the mouth to a diameter less than that of the stopper, to prevent the stopper being forced by internal pressure out of the mouth or beyond the point at which the liquid escapes from the bottle, in emptying which the contents flow past the stopper.

10. A bottle having a contraction at the base of the neck, a packing in its mouth, and an internal loose stopper between said packing and contraction, substantially as and for the purpose hereinbefore set forth.

11. A bottle having a recess in its neck, an internal stopper, and a contraction at the base of its neck, substantially as hereinbefore set forth, whereby the bottle may be tightly closed, the stopper is prevented from dropping to the bottom of the bottle when it is opened, and may be prevented from moving back to the mouth by the recess.

HIRAM CODD.

Witnesses:
EMMA CODD,
REBECCA COPPINGS,
*Both of* 10 *Brownswood Park, South Hornsey, N. London.*